United States Patent
Gass

(10) Patent No.: US 7,098,800 B2
(45) Date of Patent: Aug. 29, 2006

(54) RETRACTION SYSTEM AND MOTOR POSITION FOR USE WITH SAFETY SYSTEMS FOR POWER EQUIPMENT

(75) Inventor: Stephen F. Gass, Wilsonville, OR (US)

(73) Assignee: SD3, LLC, Wilsonville, OR (US)

( * ) Notice: Subject to any disclaimer, the term of this patent is extended or adjusted under 35 U.S.C. 154(b) by 314 days.

(21) Appl. No.: 10/794,161

(22) Filed: Mar. 4, 2004

(65) Prior Publication Data

US 2004/0173430 A1 Sep. 9, 2004

Related U.S. Application Data

(60) Provisional application No. 60/452,159, filed on Mar. 5, 2003.

(51) Int. Cl.
*G08B 21/00* (2006.01)

(52) U.S. Cl. ............... 340/679; 340/680; 340/686.1; 340/686.3; 340/686.6; 83/58; 83/63

(58) Field of Classification Search ............ 340/679, 340/680, 686.1, 687, 686.3, 686.6; 83/58, 83/62, 63
See application file for complete search history.

(56) References Cited

U.S. PATENT DOCUMENTS

| | | |
|---|---|---|
| 1,450,906 A | 4/1923 | Anderson |
| 1,582,483 A | 4/1926 | Runyan |
| 1,590,988 A | 6/1926 | Campbell |
| 2,121,069 A | 6/1938 | Collins |
| 2,392,486 A | 1/1946 | Larsen |
| 2,402,232 A | 6/1946 | Baker |
| 2,434,174 A | 1/1948 | Morgan |
| 2,452,589 A | 11/1948 | McWhirter et al. |
| 2,562,396 A | 7/1951 | Schutz |
| 2,601,878 A | 7/1952 | Anderson |
| 2,737,213 A | 3/1956 | Richards et al. |
| 2,839,943 A | 6/1958 | Caldwell et al. |
| 2,876,809 A | 3/1959 | Rentsch et al. |
| 2,883,486 A | 4/1959 | Mason |
| 2,913,581 A | 11/1959 | Simonton et al. |
| 2,957,166 A | 10/1960 | Gluck |
| 2,991,593 A | 7/1961 | Cohen |
| 3,035,995 A | 5/1962 | Seeley et al. |
| 3,184,001 A | 5/1965 | Reinsch et al. |
| 3,213,731 A | 10/1965 | Renard |
| 3,246,205 A | 4/1966 | Miller |
| 3,276,497 A | 10/1966 | Heer |
| 3,313,185 A | 4/1967 | Drake et al. |
| 3,337,008 A | 8/1967 | Trachte |

(Continued)

FOREIGN PATENT DOCUMENTS

CH 297525 6/1954

(Continued)

OTHER PUBLICATIONS

Skil Model 3400-Type 1 10" Table Saw Parts List and Technical Bulletin, S-B Power Tool Company, Jun. 1993.

(Continued)

*Primary Examiner*—Daryl C Pope

(57) ABSTRACT

Woodworking machines are disclosed having movable cutting tools for cutting workpieces in a cutting region. The machines include a detection system adapted to detect one or more dangerous conditions between a person and the cutting tools, and a reaction system associated with the detection system. The reaction system is configured to retract the cutting tool at least partially away from the cutting region upon detection of a dangerous condition by the detection system.

20 Claims, 10 Drawing Sheets

U.S. PATENT DOCUMENTS

| | | |
|---|---|---|
| 3,439,183 A | 4/1969 | Hurst, Jr. |
| 3,445,835 A | 5/1969 | Fudaley |
| 3,456,696 A | 7/1969 | Gregory et al. |
| 3,512,440 A | 5/1970 | Frydmann |
| 3,566,996 A | 3/1971 | Crossman |
| 3,580,376 A | 5/1971 | Loshbough |
| 3,593,266 A | 7/1971 | Van Sickle |
| 3,621,894 A | 11/1971 | Niksich |
| 3,688,815 A | 9/1972 | Ridenour |
| 3,696,844 A | 10/1972 | Bernatschek |
| 3,716,113 A | 2/1973 | Kobayashi et al. |
| 3,719,103 A | 3/1973 | Streander |
| 3,793,915 A | 2/1974 | Hujer |
| 3,829,970 A | 8/1974 | Anderson |
| 3,863,208 A | 1/1975 | Balban |
| 3,882,744 A | 5/1975 | McCarroll |
| 3,886,413 A | 5/1975 | Dow et al. |
| 3,935,777 A | 2/1976 | Bassett |
| 3,945,286 A | 3/1976 | Smith |
| 3,960,310 A | 6/1976 | Nussbaum |
| 3,974,565 A | 8/1976 | Ellis |
| 3,975,600 A | 8/1976 | Marston |
| 3,978,624 A | 9/1976 | Merkel et al. |
| 3,994,192 A | 11/1976 | Faig |
| 4,016,490 A | 4/1977 | Weckenmann et al. |
| 4,029,159 A | 6/1977 | Nymann |
| 4,106,378 A | 8/1978 | Kaiser |
| 4,161,649 A | 7/1979 | Klos et al. |
| 4,199,930 A | 4/1980 | Lebet et al. |
| 4,206,666 A | 6/1980 | Ashton |
| 4,206,910 A | 6/1980 | Biesemeyer |
| 4,262,278 A | 4/1981 | Howard et al. |
| 4,276,459 A | 6/1981 | Willett et al. |
| 4,291,794 A | 9/1981 | Bauer |
| 4,427,042 A | 1/1984 | Mitchell et al. |
| 4,466,170 A | 8/1984 | Davis |
| 4,559,858 A | 12/1985 | Laskowski et al. |
| 4,589,860 A | 5/1986 | Brandenstein et al. |
| 4,657,428 A | 4/1987 | Wiley |
| 4,672,500 A | 6/1987 | Tholome et al. |
| 4,675,664 A | 6/1987 | Cloutier et al. |
| 4,679,719 A | 7/1987 | Kramer |
| 4,756,220 A | 7/1988 | Olsen et al. |
| 4,774,866 A | 10/1988 | Dehari et al. |
| 4,831,279 A | 5/1989 | Ingraham |
| 4,845,476 A | 7/1989 | Rangeard et al. |
| 4,896,607 A | 1/1990 | Hall et al. |
| 4,907,679 A | 3/1990 | Menke |
| 4,934,233 A | 6/1990 | Brundage et al. |
| 4,936,876 A | 6/1990 | Reyes |
| 4,937,554 A | 6/1990 | Herman |
| 4,964,450 A | 10/1990 | Hughes et al. |
| 4,975,798 A | 12/1990 | Edwards et al. |
| 5,020,406 A | 6/1991 | Sasaki et al. |
| 5,042,348 A | 8/1991 | Brundage et al. |
| 5,074,047 A | 12/1991 | King |
| 5,083,973 A | 1/1992 | Townsend |
| 5,094,000 A | 3/1992 | Becht et al. |
| 5,116,249 A | 5/1992 | Shiotani et al. |
| 5,199,343 A | 4/1993 | OBanion |
| 5,201,110 A | 4/1993 | Bane |
| 5,206,625 A | 4/1993 | Davis |
| 5,231,359 A | 7/1993 | Masuda et al. |
| 5,239,978 A | 8/1993 | Plangetis |
| 5,293,802 A | 3/1994 | Shiotani et al. |
| 5,353,670 A | 10/1994 | Metzger, Jr. |
| 5,392,568 A | 2/1995 | Howard, Jr. et al. |
| 5,401,928 A | 3/1995 | Kelley |
| 5,411,221 A | 5/1995 | Collins et al. |
| 5,423,232 A | 6/1995 | Miller et al. |
| 5,436,613 A | 7/1995 | Ghosh et al. |
| 5,447,085 A | 9/1995 | Gochnauer |
| 5,451,750 A | 9/1995 | An |
| 5,453,903 A | 9/1995 | Chow |
| 5,480,009 A | 1/1996 | Wieland et al. |
| 5,503,059 A | 4/1996 | Pacholok |
| 5,510,587 A | 4/1996 | Reiter |
| 5,531,147 A | 7/1996 | Serban |
| 5,592,353 A | 1/1997 | Shinohara et al. |
| 5,619,896 A | 4/1997 | Chen |
| 5,623,860 A | 4/1997 | Schoene et al. |
| 5,647,258 A | 7/1997 | Brazell et al. |
| 5,648,644 A | 7/1997 | Nagel |
| 5,659,454 A | 8/1997 | Vermesse |
| 5,700,165 A | 12/1997 | Harris et al. |
| 5,722,308 A | 3/1998 | Ceroll et al. |
| 5,741,048 A | 4/1998 | Eccleston |
| 5,791,441 A | 8/1998 | Matos et al. |
| 5,819,619 A | 10/1998 | Miller et al. |
| 5,852,951 A | 12/1998 | Santi |
| 5,857,507 A | 1/1999 | Puzio et al. |
| 5,880,954 A | 3/1999 | Thomson et al. |
| 5,927,857 A | 7/1999 | Ceroll et al. |
| 5,930,096 A | 7/1999 | Kim |
| 5,943,932 A | 8/1999 | Sberveglieri |
| 5,974,927 A | 11/1999 | Tsune |
| 6,009,782 A | 1/2000 | Tajima et al. |
| 6,052,884 A | 4/2000 | Steckler et al. |
| 6,062,121 A | 5/2000 | Ceroll et al. |
| 6,070,484 A | 6/2000 | Sakamaki |
| 6,112,785 A | 9/2000 | Yu |
| 6,141,192 A | 10/2000 | Garzon |
| 6,148,703 A | 11/2000 | Ceroll et al. |
| 6,150,826 A | 11/2000 | Hokodate et al. |
| 6,161,459 A | 12/2000 | Ceroll et al. |
| 6,250,190 B1 | 6/2001 | Ceroll et al. |
| 6,325,195 B1 | 12/2001 | Doherty |
| 6,330,848 B1 | 12/2001 | Nishio et al. |
| 6,336,273 B1 | 1/2002 | Nilsson et al. |
| 6,352,137 B1 | 3/2002 | Stegall et al. |
| 6,357,328 B1 | 3/2002 | Ceroll et al. |
| 6,376,939 B1 | 4/2002 | Suzuki et al. |
| 6,427,570 B1 | 8/2002 | Miller et al. |
| 6,431,425 B1 | 8/2002 | Moorman et al. |
| 6,471,106 B1 | 10/2002 | Reining |
| 6,484,614 B1 | 11/2002 | Huang |
| 6,492,802 B1 | 12/2002 | Bielski |
| 6,564,909 B1 | 5/2003 | Razzano |
| 6,581,655 B1 | 6/2003 | Huang |
| 6,617,720 B1 | 9/2003 | Egan, III et al. |
| 6,644,157 B1 | 11/2003 | Huang |
| 6,659,233 B1 | 12/2003 | DeVlieg |
| 6,684,750 B1 | 2/2004 | Yu |
| 6,722,242 B1 | 4/2004 | Chuang |
| 6,734,581 B1 | 5/2004 | Griffis |
| 6,736,042 B1 | 5/2004 | Behne et al. |
| 6,742,430 B1 | 6/2004 | Chen |
| 6,796,208 B1 | 9/2004 | Jorgensen |
| 6,800,819 B1 | 10/2004 | Sato et al. |
| 6,826,988 B1 | 12/2004 | Gass et al. |
| 6,826,992 B1 | 12/2004 | Huang |
| 6,840,144 B1 | 1/2005 | Huang |
| 6,854,371 B1 | 2/2005 | Yu |
| 6,857,345 B1 | 2/2005 | Gass et al. |
| 6,874,397 B1 | 4/2005 | Chang |
| 6,874,399 B1 | 4/2005 | Lee |
| 6,883,397 B1 | 4/2005 | Kimizuka |
| 6,889,585 B1 | 5/2005 | Harris et al. |
| 6,920,814 B1 | 7/2005 | Gass et al. |
| 6,922,153 B1* | 7/2005 | Pierga et al. ............ 340/686.5 |
| 6,945,148 B1 | 9/2005 | Gass et al. |
| 6,945,149 B1 | 9/2005 | Gass et al. |
| 6,957,601 B1 | 10/2005 | Gass et al. |
| 6,968,767 B1 | 11/2005 | Yu |

| | | |
|---|---|---|
| 6,986,370 B1 | 1/2006 | Schoene et al. |
| 6,994,004 B1 | 2/2006 | Gass et al. |
| 6,997,090 B1 | 2/2006 | Gass et al. |
| 7,000,514 B1 * | 2/2006 | Gass et al. .............. 83/58 |
| 2001/0032534 A1 | 10/2001 | Cerroll et al. |
| 2002/0043776 A1 | 4/2002 | Chuang |
| 2002/0050201 A1 | 5/2002 | Lane et al. |
| 2003/0000359 A1 | 1/2003 | Eccardt et al. |
| 2003/0037655 A1 | 2/2003 | Chin-Chin |
| 2004/0011177 A1 | 1/2004 | Huang |
| 2004/0060404 A1 | 4/2004 | Metzger, Jr. |
| 2004/0104085 A1 | 6/2004 | Lang et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2004/0255745 A1 | 12/2004 | Peot et al. |
| 2005/0057206 A1 | 3/2005 | Uneyama |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0155473 A1 | 7/2005 | Gass |
| 2005/0166736 A1 | 8/2005 | Gass et al. |
| 2005/0178259 A1 | 8/2005 | Gass et al. |
| 2005/0204885 A1 | 9/2005 | Gass et al. |
| 2005/0211034 A1 | 9/2005 | Sasaki et al. |
| 2005/0235793 A1 | 10/2005 | O'Banion et al. |
| 2005/0274432 A1 | 12/2005 | Gass et al. |
| 2006/0000337 A1 | 1/2006 | Gass |
| 2006/0032352 A1 | 2/2006 | Gass et al. |

FOREIGN PATENT DOCUMENTS

| | | |
|---|---|---|
| DE | 76186 | 8/1921 |
| DE | 2800403 | 7/1979 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1988 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |

OTHER PUBLICATIONS

Shop Fox® Fence Operating Manual, Woodstock International, Inc., 1996, revised May 1997.
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Company, Sep. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Laguna Tools table saw owner's manual, date unknown.
Analog Devices, Inc., 3-Axis Capacitive Sensor—Preliminary Technical Data AD7103, pp. 1-40, © 1998.
Gordon Engineering Corp., Product Catalog, Oct. 1997, pgs. cover, 1, 3 and back, Brookfield, Connecticut, US.
U.S. Appl. No. 60/157,340, filed Oct. 1, 1999, entitled "Fast-Acting Safety Stop."
U.S. Appl. No. 60/182,866, filed Feb. 16, 2000, entitled "Fast-Acting Safety Stop."
IWF 2000 Challengers Award Official Entry Form, submitted Apr. 26, 2000, 6 pages plus CD (the portions of US patent applications referenced in the form are from U.S. Appl. No. 60/157,340, filed Oct. 1, 1999 and U.S. Appl. No. 60/182,866, filed Feb. 16, 2000).
*You Should Have Invented It*, French television show video.

* cited by examiner

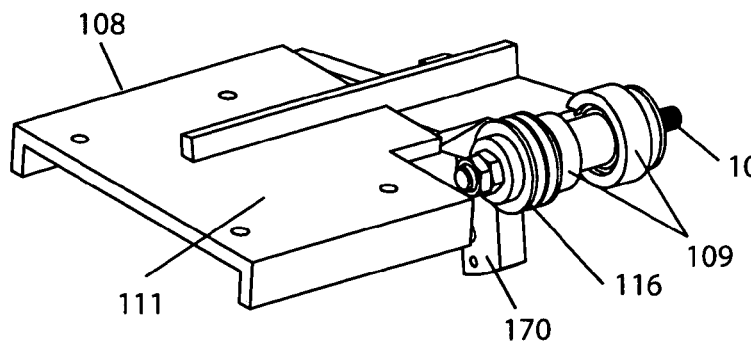
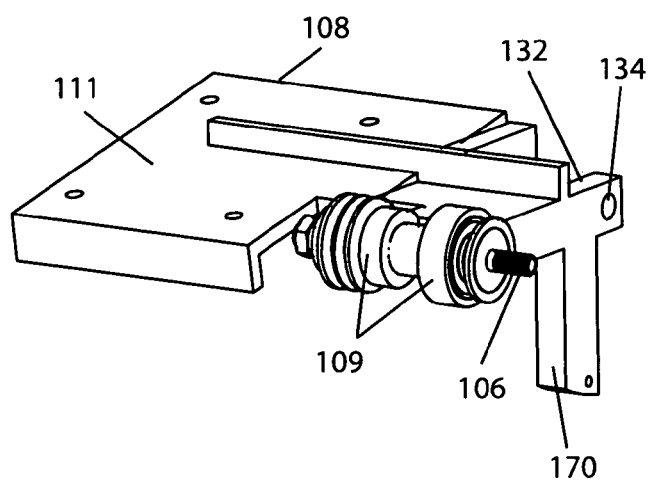
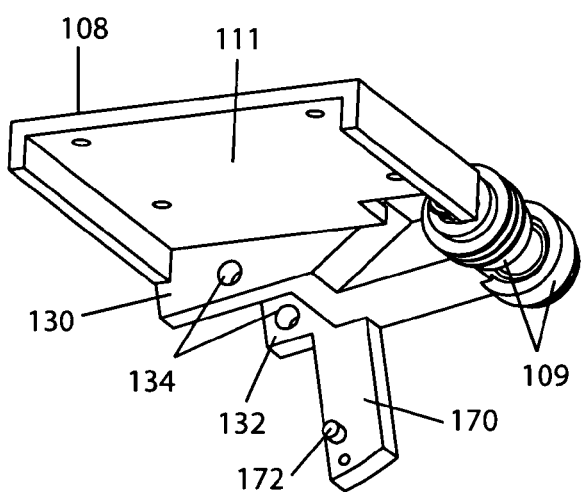
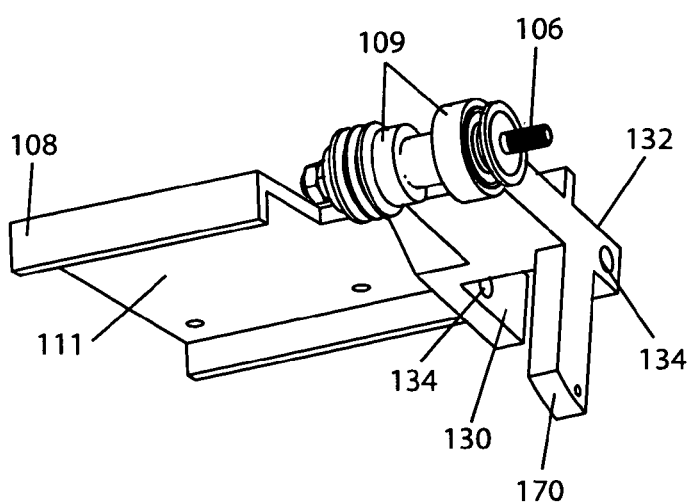

RETRACTION SYSTEM AND MOTOR POSITION FOR USE WITH SAFETY SYSTEMS FOR POWER EQUIPMENT

CROSS-REFERENCE TO RELATED APPLICATION

This application claims the benefit of and priority from the following U.S. Provisional Patent Application, the disclosure of which is herein incorporated by reference: Ser. No. 60/452,159, filed Mar. 5, 2003.

FIELD

The present invention relates to safety systems and more particularly to retraction systems and motor positions for use with safety systems for power equipment.

BACKGROUND

Power equipment such as table saws and other woodworking machinery include cutting tools like circular saw blades and knife blades that present a risk of injury to a user of the equipment. Accordingly, safety features or systems are incorporated with power equipment to minimize the risk of injury. Probably the most common safety feature is a guard that physically blocks an operator from making contact with dangerous components of machinery, such as belts, shafts or blades. In many cases, guards effectively reduce the risk of injury, however, there are many instances where the nature of the operations to be performed precludes using a guard that completely blocks access to hazardous machine parts.

Other safety systems try to prevent or minimize injury by detecting and reacting to an event. For instance, U.S. Pat. Nos. 3,953,770, 4,075,961, 4,470,046, 4,532,501 and 5,212,621, the disclosures of which are incorporated herein by reference, disclose radio-frequency safety systems which utilize radio-frequency signals to detect the presence of a user's hand in a dangerous area of the machine and thereupon prevent or interrupt operation of the machine. U.S. Pat. Nos. 3,785,230 and 4,026,177, the disclosures of which are herein incorporated by reference, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid.

U.S. Pat. No. 4,117,752, which is herein incorporated by reference, discloses a braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50 ms–1 s to stop the blade. Therefore, the system is too slow to stop the blade quickly enough to avoid serious injury.

BRIEF DESCRIPTION OF THE DRAWINGS

FIGS. 12–15 show various views of the arbor block shown in FIG. 11.

DETAILED DESCRIPTION

Figure 1:
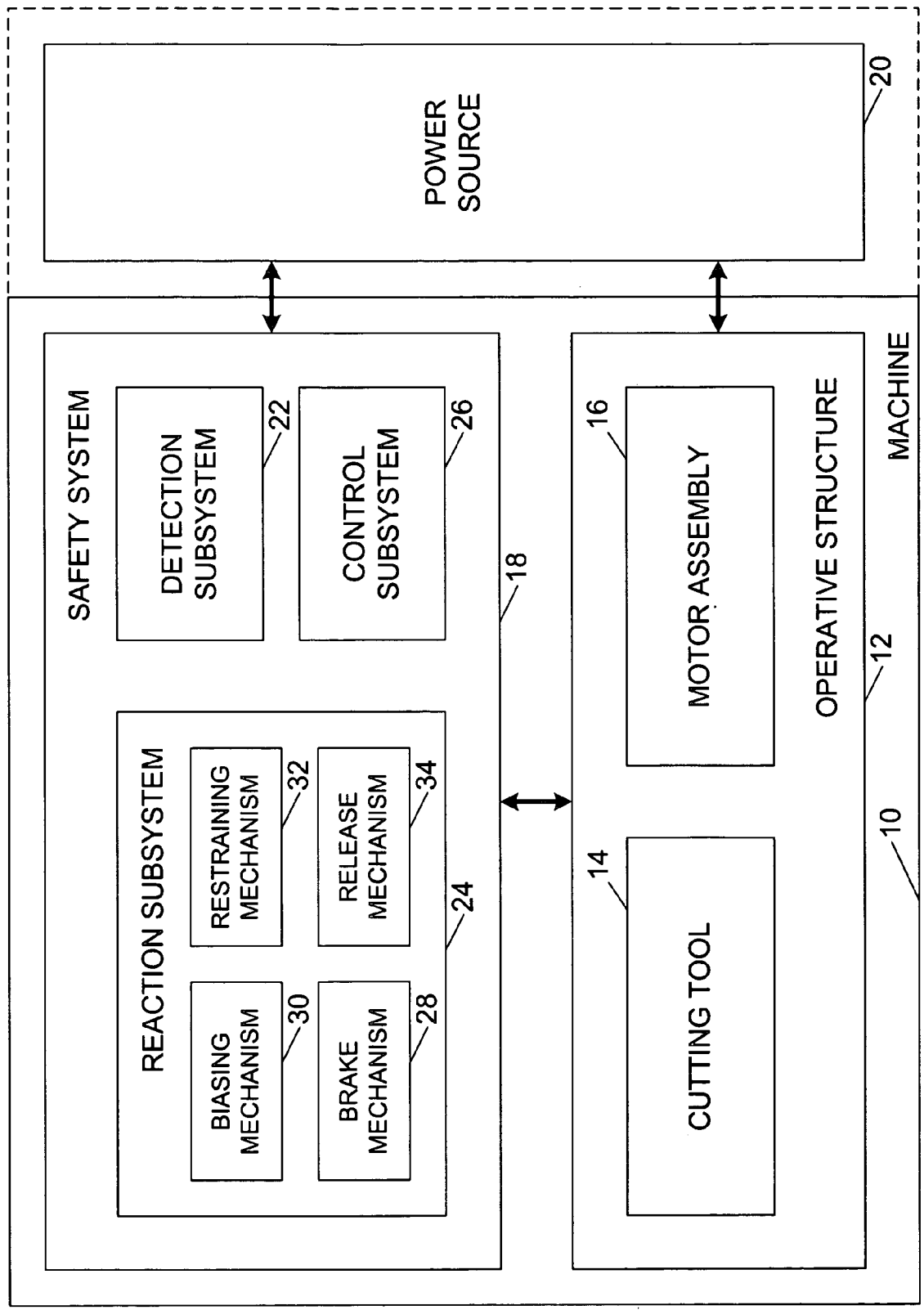
FIG. 1 is a schematic block diagram of a machine with a fast-acting safety system.

A machine that may incorporate a retraction system and/or motor position according to the present invention is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. patent application Ser. No. 09/676,190, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Patent Application Publication No. 2002/0017183 A1, entitled "Cutting Tool Safety System," the disclosure of which is herein incorporated by reference. Retracting the cutting tool is described in more detail in U.S. Patent Application Publication No. 2002/0017181 A1, entitled "Retraction System for Use in Power Equipment," the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
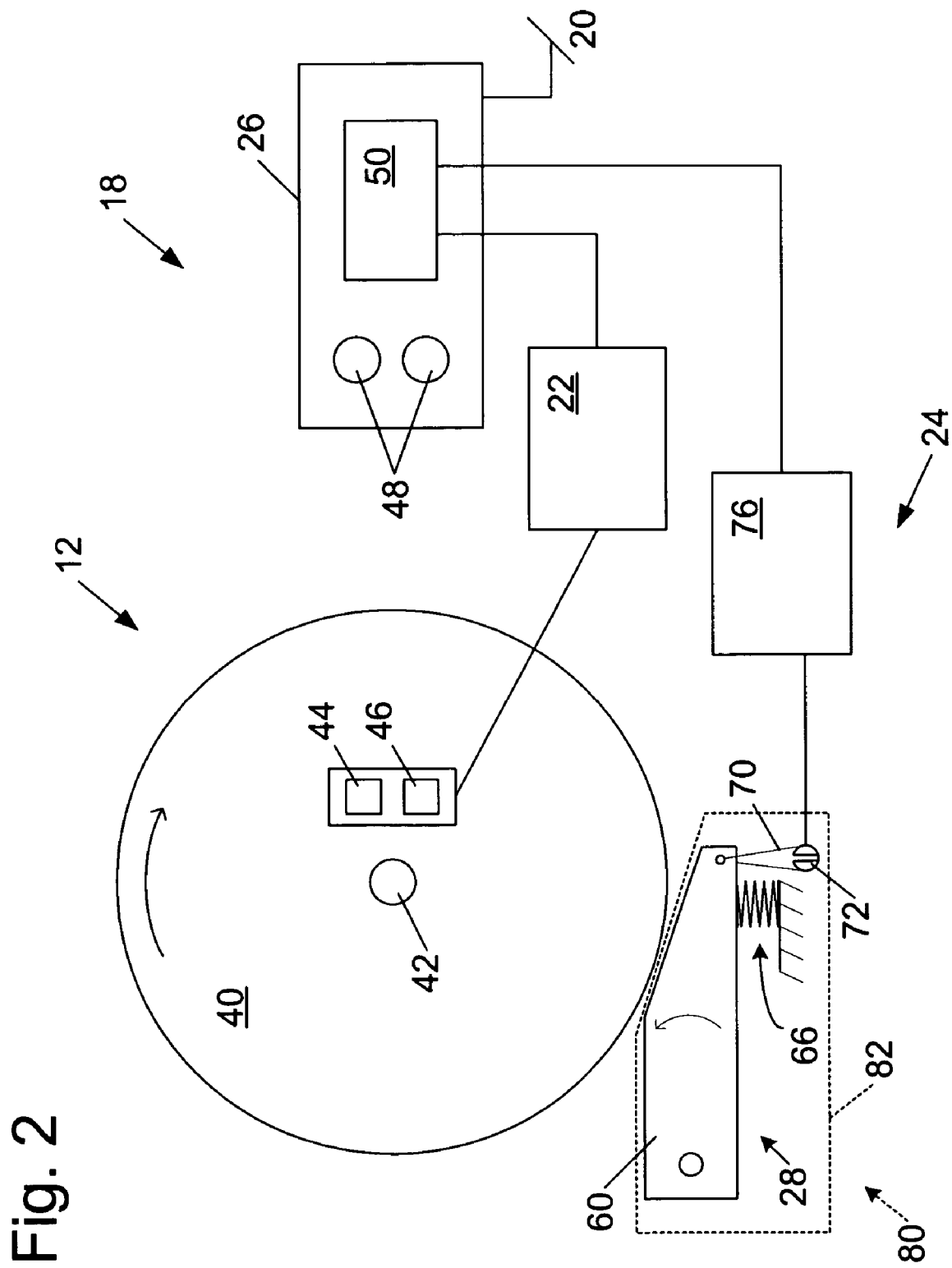
FIG. 2 is a schematic diagram of an exemplary safety system in the context of a machine having a circular blade.
Figure 3:
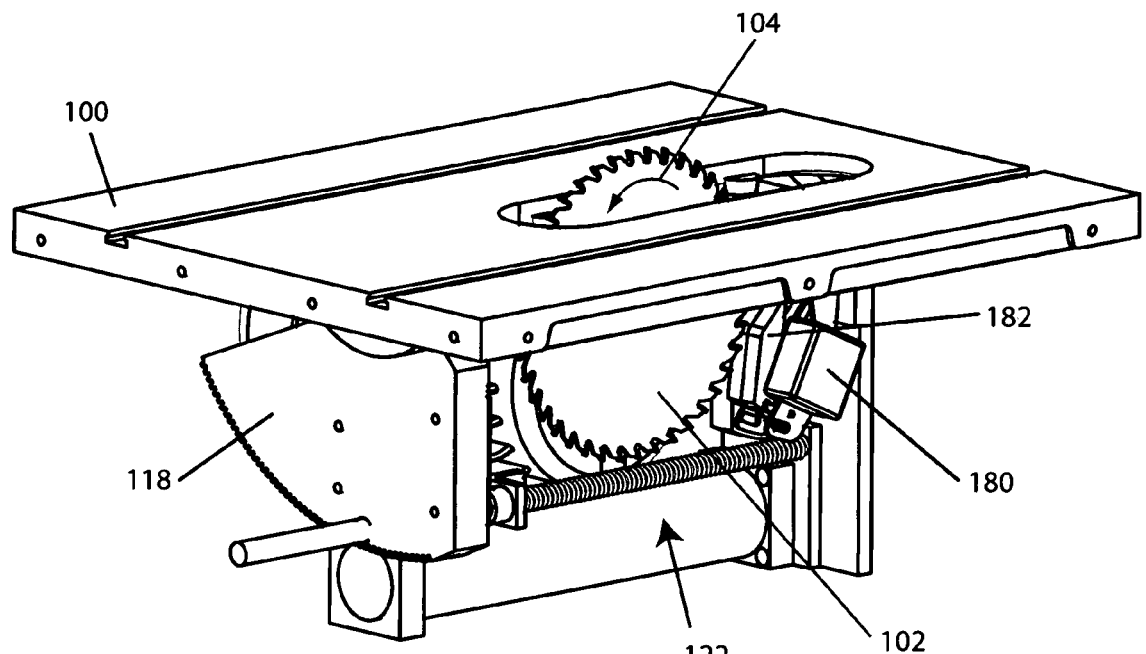
FIG. 3 is a perspective view of a table saw with a retraction system and motor position as described herein. The cabinet and several other parts have been redacted for clarity.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Patent Application Publication No. 2002/0017175 A1, entitled "Translation Stop For Use In Power Equipment," the disclosure of which is herein incorporated by reference, describes other systems for stopping the movement of the cutting tool. U.S. Patent Application Publication No. 2002/0017184 A1, entitled "Table Saw With Improved Safety System," U.S. Patent Application Publication No. 2002/0017179 A1, entitled "Miter Saw With Improved Safety System," U.S. Patent Application Publication No. 2002/0059855 A1, entitled "Miter Saw with Improved Safety System," U.S. Patent Application Publication No. 2002/0056350 A1, entitled "Table Saw With Improved Safety System," U.S. Patent Application Publication No. 2002/0059854 A1, entitled "Miter Saw With Improved Safety System," U.S. Patent Application Publication No. 2002/0056349 A1, entitled "Miter Saw With Improved Safety System," U.S. Patent Application Publication No. 2002/0056348 A1, entitled "Miter Saw With Improved Safety System," and U.S. Patent Application Publication No. 2002/0066346 A1, entitled "Miter Saw With Improved Safety System," U.S. patent application Ser. No. 10/197,975, entitled "Router With Improved Safety System," filed Jul. 18, 2002 by SD3, LLC, U.S. Patent Application Publication No. 2002/0170400 A1, entitled "Band Saw With Improved Safety System," U.S. patent application Ser. No. 10/202,928, entitled "Safety Systems for Band Saws," filed Jul. 25, 2002 by SD3, LLC, U.S. patent application Ser. No. 10/251,576, entitled "Router With Improved Safety System," filed Sep. 20, 2002 by SD3, LLC, and U.S. Provisional Patent Application Ser. No. 60/406,138, entitled "Miter Saw With Improved Safety System," filed Aug. 27, 2002 by SD3, LLC, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Patent Application Publication No. 2002/0017176 A1, entitled "Detection System For Power Equipment," U.S. Patent Application Publication No. 2002/0017336 A1, entitled "Apparatus And Method For Detecting Dangerous Conditions In Power Equipment," U.S. Patent Application Publication No. 2002/0069734 A1, entitled "Contact Detection System for Power Equipment," U.S. Patent Application Publication No. 2002/0190581 A1, entitled "Apparatus and Method for Detecting Dangerous Conditions in Power Equipment," U.S. Patent Application Publication No. 2003/0002942 A1, entitled "Discrete Proximity Detection System," and U.S. patent application Ser. No. 10/292,607, entitled "Detection System for Power Equipment," filed Nov. 12, 2002 by SD3, LLC, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Patent Application Publication No. 2002/0020262 A1, entitled "Logic Control For Fast Acting Safety System," U.S. Patent Application Publication No. 2002/0017178 A1, entitled "Motion Detecting System For Use In Safety System For Power Equipment," and U.S. patent application Ser. No. 10/243,042, entitled "Logic Control With Test Mode for Fast-Acting Safety System," filed Sep. 13, 2002 by SD3, LLC, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately 1/32-inch to 1/4-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Patent Application Publication No. 2002/0020263 A1, entitled "Firing Subsystem For Use In A Fast-Acting Safety System," U.S. Patent Application Publication No. 2002/0020271 A1, entitled "Spring-Biased Brake Mechanism for Power Equipment," U.S. Patent Application Publication No. 2002/0017180 A1, entitled "Brake Mechanism For Power Equipment," U.S. Patent Application Publication No. 2002/0059853 A1, entitled "Power Saw With Improved Safety System," U.S. Patent Application Publication No. 2002/0020265 A1, entitled "Translation Stop For Use In Power Equipment," U.S. Patent Application Publication No. 2003/0005588 A1, entitled "Actuators For Use in Fast-Acting Safety Systems," and U.S. patent application Ser. No. 10/205,164, entitled "Actuators For Use In Fast-Acting Safety Systems," filed Jul. 25, 2002 by SD3, LLC, the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge, and various brake pawls, are described in more detail in U.S. Patent Application Publication No. 2002/0020261 A1, entitled "Replaceable Brake Mechanism For Power Equipment," U.S. Patent Application Publication No. 2002/0017182 A1, entitled "Brake Positioning System," and U.S. patent application Ser. No. 10/341,260, entitled "Brake Pawls for Power Equipment," filed Jan. 13, 2003 by SD3, LLC, the disclosures of which are herein incorporated by reference.

While one particular implementation of safety system 18 has been described, it will be appreciated that many variations and modifications are possible within the scope of the invention. Many such variations and modifications are described in U.S. Patent Application Publication No. 2002/0170399 A1, entitled "Safety Systems for Power Equipment," U.S. patent application Ser. No. 10/215,929, entitled "Safety Systems for Power Equipment," filed Aug. 9, 2002 by SD3, LLC, and U.S. patent application Ser. No. 10/345,630, entitled "Apparatus and Method for Detecting Dangerous Conditions in Power Equipment," filed Jan. 15, 2003 by SD3, LLC, the disclosures of which are herein incorporated by reference.

As briefly mentioned above, reaction subsystem 24 can be configured with a retraction system to retract or move a cutting tool away from the point of accidental contact with a user. Moving away from the point of accidental contact reduces the time the cutting tool is in contact with the user, thereby minimizing any injury to the user. Moving the cutting tool away from the point of accidental contact also prevents the cutting tool from moving toward the user, which could increase any injury to the user. For example, the spinning blade in a table saw has substantial angular momentum that could cause the blade to move upward toward a user when a brake pawl hits the blade, depending on the position of the brake, the weight of the blade and the amount of play in the structure supporting the blade. Preventing any such movement lessens the potential injury to the user. A retraction system may be used in addition to or instead of other safety mechanisms.

Figure 10:
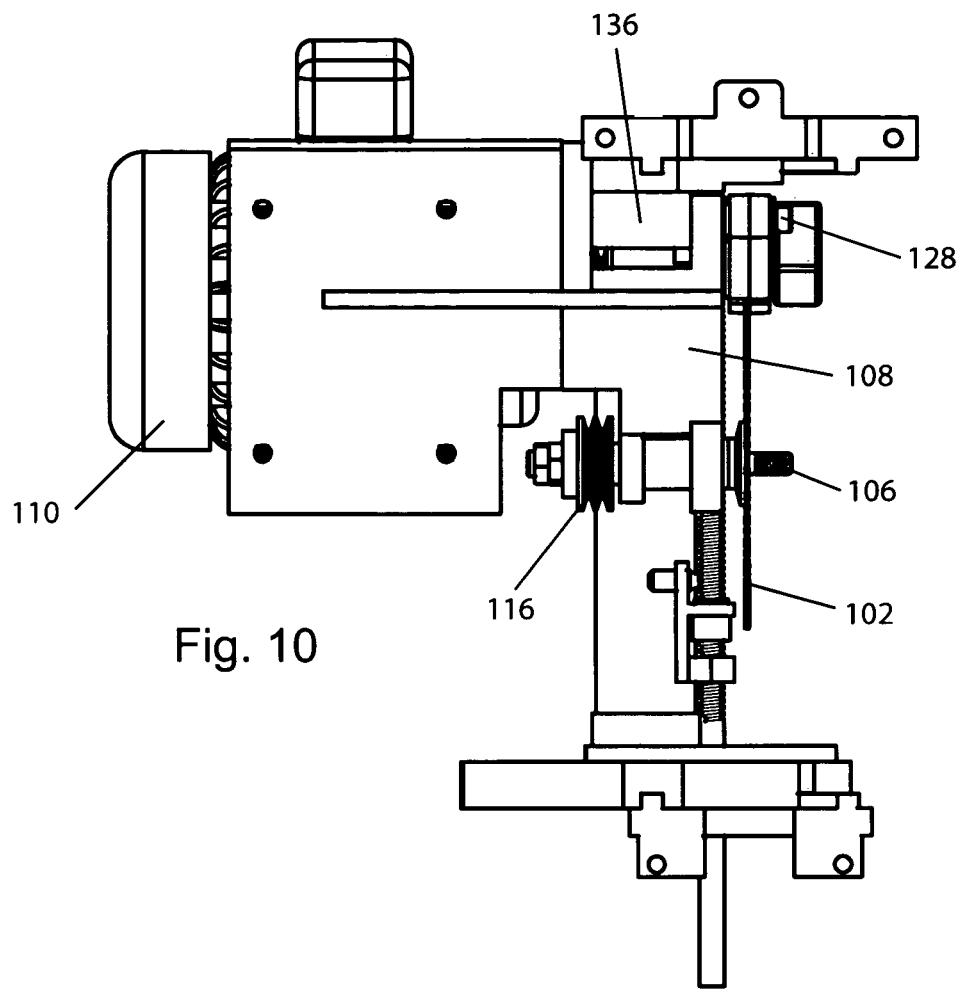
FIG. 10 is a top view of the saw shown in FIG. 3, with the table top removed for clarity.
Figure 11:
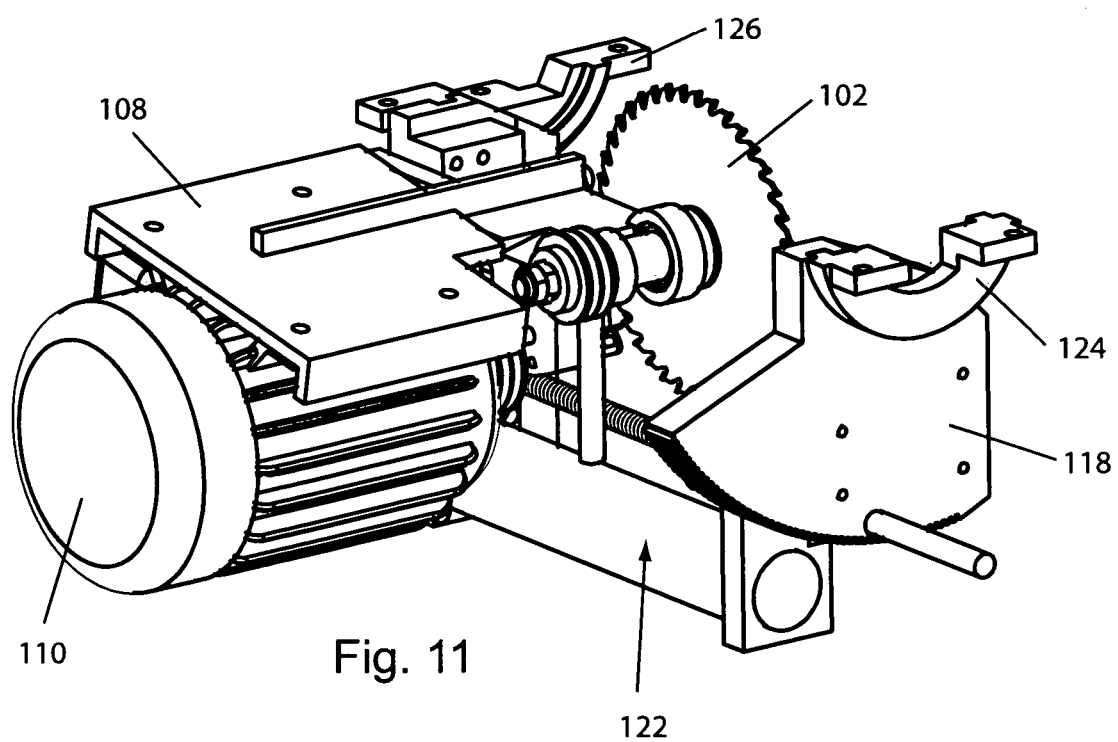
FIG. 11 is a perspective view of the saw shown in FIG. 3 with the table top removed to show the arbor block and motor.

FIGS. 3 through 11 show various views of a table saw equipped with a retraction system to cause the blade to retract when contact between the blade and a person is detected. In most of those figures, the table, blade, and internal mechanism of the saw are visible. Other parts of the saw, such as the cabinet, extension wings, wiring, belts, hand wheels, shafts, gears, etc., are not shown in order to make specific parts of the saw more visible. In FIGS. 10 and 11, the table is not shown.

FIGS. 3 through 9 show a table 100 and a blade 102 extending up through an aperture in the table. In operation, blade 102 spins in the direction of arrow 104 shown in FIG. 3. To cut a work piece, a user places the work piece on the table and slides it into contact with and past the spinning blade.

Blade 102 is mounted on a shaft called an arbor 106, as shown best in FIGS. 5 and 9 through 11. Arbor 106, in turn, is supported by an arbor block 108. Arbor block 108 is shown isolated with the arbor in FIGS. 12 through 15. The arbor block includes two annular rings 109. The arbor is supported for rotation in annular rings 109 by bearings fitted into the rings, as is known in the art. A motor 110 is mounted on the arbor block, as shown in FIGS. 4, 6, 7 and 11, by bolting to a plate 111 that is part of the arbor block. A drive shaft 112 (identified in FIG. 9) extends from the motor, and a drive pulley 114 (also identified in FIG. 9) is mounted on the drive shaft, also as is known in the art. An arbor pulley 116 is mounted on the arbor, and a belt (not shown) extends between and around the drive pulley and the arbor pulley. When motor 110 is actuated, the drive pulley turns, causing the arbor pulley to turn, and thereby spinning the arbor and the blade.

Arbor block 108 is supported in the saw by a trunnion assembly. The trunnion assembly includes a front trunnion 118, a rear trunnion 120, and a structure 122 connecting the two trunnions. The two trunnions, in turn, are mounted on front and rear trunnion brackets, 124 and 126, respectively (shown best in FIG. 11), and the trunnion brackets are connected to the table or cabinet. The front and rear trunnions are mounted on the trunnion brackets so that the trunnions can tilt to the right or left, thereby allowing a user to change the tilt or angle of the blade, as is known in the art. In the saw shown in the figures, front trunnion 118 includes a sector gear 127, labeled in FIG. 7, that is used in combination with a worm gear (not shown) to change the tilt of the saw blade.

Arbor block 108 is mounted on rear trunnion 120 by a pivot pin 128. Arbor block 108 includes two arms 130 and 132 (shown best in FIGS. 13–15), the arms having axial holes 134. The two arms are positioned around a block 136 on the rear trunnion 120, and the block also has a hole passing through it. A pivot pin 128 passes through the holes in the arms and block to mount the arbor block to the rear trunnion. This construction is shown in FIG. 16.

This manner of mounting arbor block 108 in the saw allows the arbor block to pivot up and down around pivot pin 128, thereby changing the elevation of the blade relative to the table. Pivoting the arbor block up causes the blade to extend further above the table top. A user can raise the blade to cut thicker work pieces by causing the arbor block to pivot up. Pivoting the arbor block down causes the blade to retract beneath the table.

Figure 16:
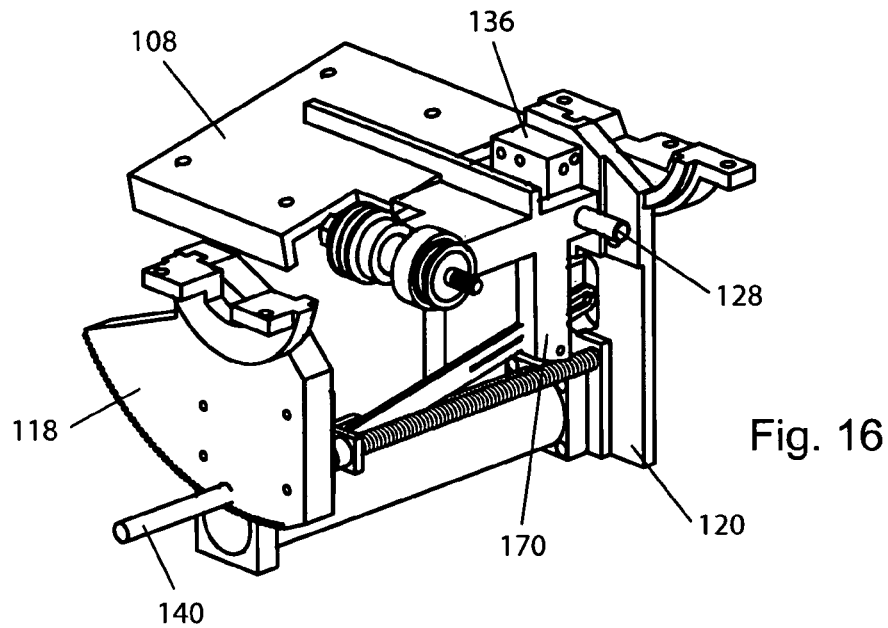
FIG. 16 is a right perspective view of saw of FIG. 3, with the table, motor and brake cartridge assembly removed to show the arbor block in the saw.
Figure 17:
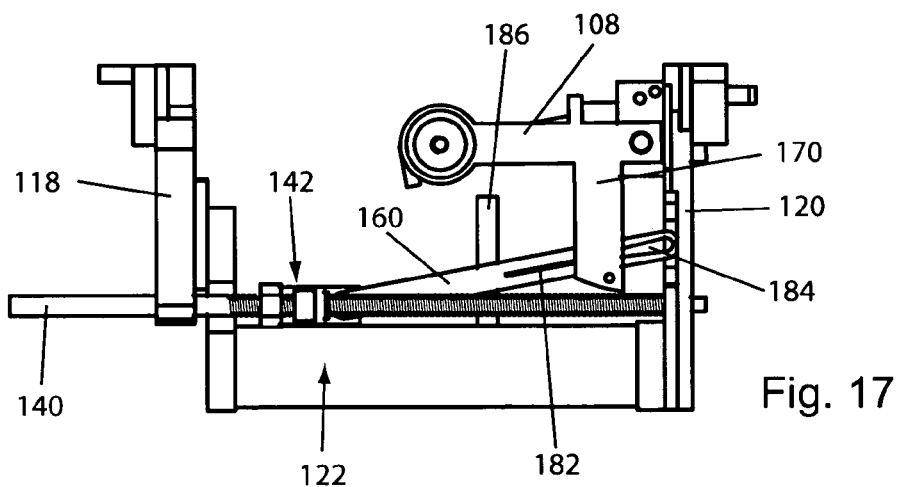
FIG. 17 is a right-side view of the arbor block in the saw.
Figure 18:
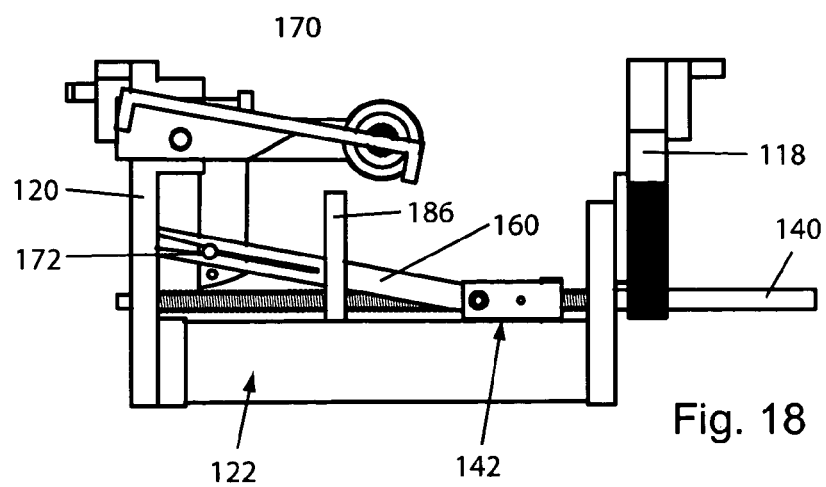
FIG. 18 is a left-side view of the arbor block in the saw.
Figure 19:
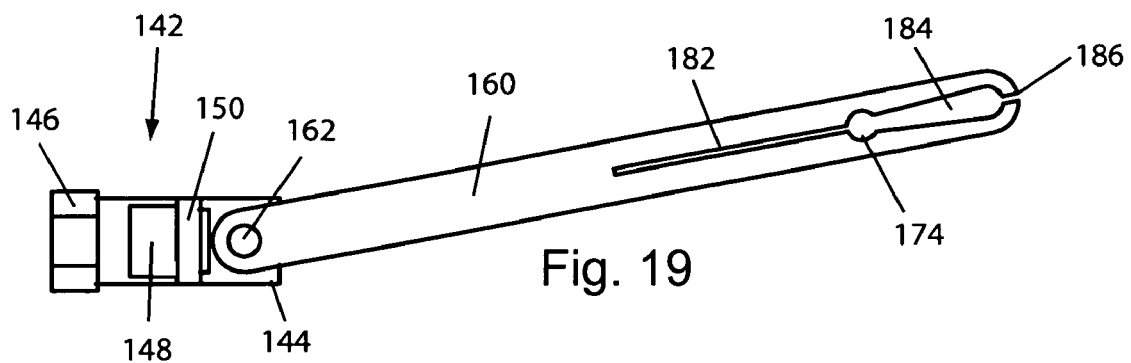
FIGS. 19–21 show various views of an elevation link and traveler isolated from the rest of the saw.
Figure 20:
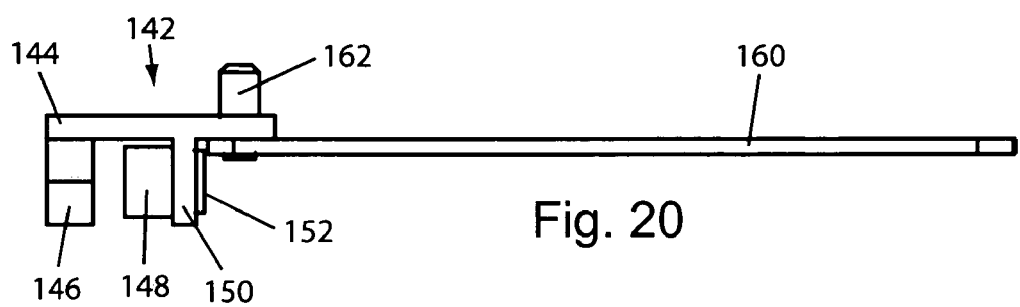
Figure 21:
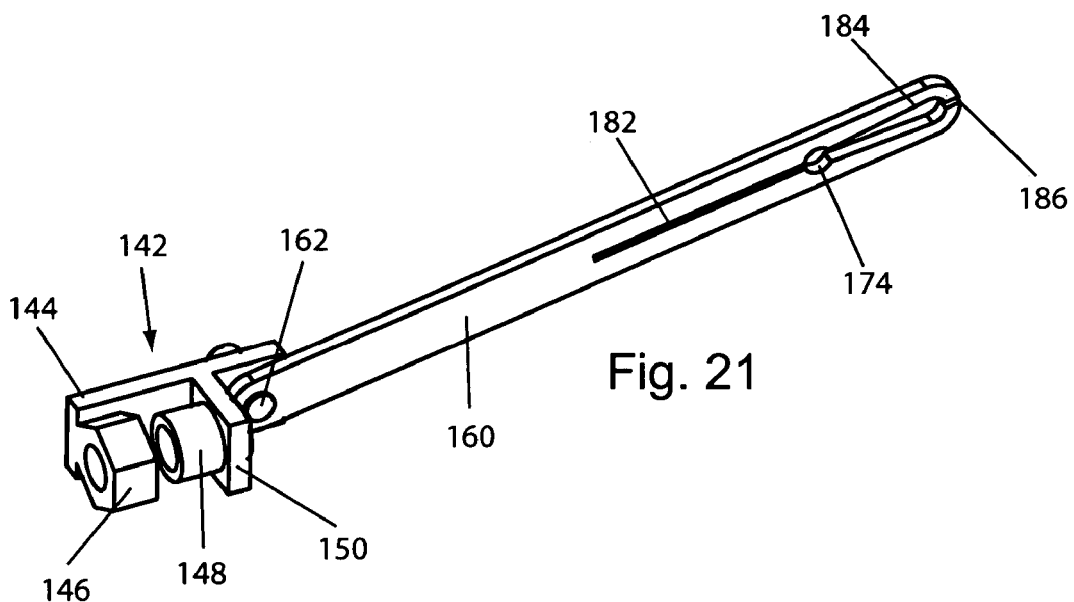

The position of the arbor block is adjusted by an elevation link assembly, shown best in FIGS. 16 through 18. The elevation link assembly includes a threaded shaft 140 supported between front trunnion 118 and rear trunnion 120. In the embodiment shown, the shaft is an Acme threaded shaft having a ¾ inch diameter and 5 threads per inch. The threaded shaft is mounted between the trunnions so that it can turn. A hand wheel (not shown) is positioned on the end of the shaft adjacent the front of the saw so that a user can turn the hand wheel to turn the shaft.

A carriage assembly 142 is threaded on the shaft, as shown in FIGS. 17 and 18. The carriage assembly includes a plate 144, and a first nut 146 is attached to the plate. That nut is threaded to mesh with threaded shaft 140. A second nut 148 is mounted to plate 144, and the second nut is also threaded to mesh with the threaded shaft. Shaft 140 is threaded through the first and second nuts, as shown. An end 152 of second nut 148 is threaded with fine threads, and the second nut is mounted to plate 144 by screwing into a threaded hole in a flange 150 extending from the plate. The threads on end 152 of second nut 148 allow for the position of the second nut relative to the first nut to be adjusted (in a sense the second nut pulls against the first nut) to remove any backlash in the mounting of the carriage assembly on the threaded shaft. In other words, the position of the second nut can be adjusted to minimize any play the carriage assembly has on the threaded shaft.

An elevation link 160 is mounted on a bolt or pin 162 that extends through and is mounted to plate 144 of the carriage assembly. Elevation link 160 extends away from the carriage assembly and is attached at its other end to arbor block 108. As shown in FIGS. 12–18, arbor block 108 includes a downwardly projecting arm 170, and a pin 172 extends out from near the bottom of the arm. Elevation link 160 includes an aperture 174 configured to receive pin 172. Thus, the elevation link is connected at one end to carriage assembly 142, and at its other end to arbor block 108, as shown in FIG. 18.

When a user turns threaded shaft 140, carriage assembly 142 moves on the shaft, either forward or backward depending on the direction the shaft turns, because the threads on the shaft mesh with threaded nuts 146 and 148. Elevation link 160 moves with the carriage assembly. Because the elevation link is connected to the arbor block, and because the arbor block pivots around pin 128, moving the carriage assembly and elevation link back and forth on the threaded shaft causes the arbor block to pivot up and down. Specifically, when carriage assembly 142 moves down shaft 140 toward the downstream side of the saw, elevation link 160 pushes on pin 172 causing arbor block 108 and blade 102 to pivot down. When carriage assembly 142 moves up shaft 140, arbor block 108 pivots up, causing blade 102 to rise.

The table saw shown in FIGS. 3 through 18 includes contact detection and reaction systems as described above. The reaction system includes a brake cartridge 180 mounted on pivot pin 128. The brake cartridge includes a brake pawl 182, positioned adjacent the perimeter of blade 102. When the detection system detects accidental contact with the blade, the brake cartridge pivots brake pawl 182 into the teeth of blade 102. The teeth cut into the brake pawl and bind, stopping the blade. Stopping the blade from spinning happens very quickly, as described above.

When the blade is spinning it has a certain angular momentum. When the blade is stopped, that angular momentum creates a downward force on the blade and arbor block because of the geometry and relative positions of pivot pin 128 and brake cartridge 180. In other words, the angular momentum of the blade and the geometry of the arbor block, pivot pin and brake cartridge create a significant force that tries to move the arbor block and blade down when the blade is stopped.

The elevation link assembly described above takes advantages of this downward force and allows that force to cause the blade to retract below the table in the event of an accident. As shown in FIGS. 16 through 19 and 21, elevation link 160 includes a slot 182. The slot extends between carriage assembly 142 and aperture 174, and connects to aperture 174. Elevation link 160 also includes a recess 184 extending beyond aperture 174. A second slot 186 also is cut into the end of elevation link 160, and that slot connects to recess 184, effectively making the elevation link into two fingers or a fork that holds pin 172 in place. Slots 182 and 186, and recess 184, function to provide a spring force on pin 172 when the pin is in aperture 174. Aperture 174, pin 172, slots 182 and 186, and recess 184 are sized so that there is a sufficient spring force holding pin 172 in aperture 174 during normal operation of the saw. However, when an accident occurs and the brake cartridge stops the blade, the downward force created by the angular momentum of the blade overcomes the spring force holding pin 172 in aperture 174, and the pin snaps free of the aperture. When pin 172 is out of aperture 174, the arbor block is free to move down, and it does so because of the angular momentum of the blade. The arbor block moves down, and pin 172 moves into recess 184.

Figure 22:
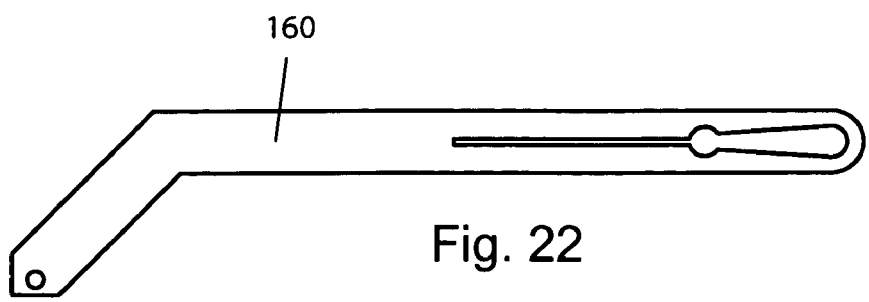
FIG. 22 shows an alternative elevation link.

The spring force holding pin 172 in aperture 174 can be varied by changing the geometry of aperture 174, the geometry of slot 182, the geometry of recess 184, and/or the existence of slot 186. Additionally, elevation link 160 may be made of various materials, such as hard or soft steel, or it may be made of metal of varying thicknesses. The length and/or shape of the elevation link also can be adjusted to vary the force required to hold the pin in place. An alternative elevation link 160 is shown in FIG. 22. That link has a different shape, including a step or bend in the length of the link. Also, slot 186 has been eliminated. All of these factors can be adjusted and/or selected to achieve the desired spring force holding pin 172 in place. It is believed that the spring force on pin 172, depending on the geometry of a given embodiment, may need to be between approximately 50–500 lbs.

In this manner, the saw shown in FIGS. 3 through 18 includes a retraction system to allow the blade to retract below the table in the event of an accident. The angular momentum of stopping the blade creates a downward force that causes arbor block 108 to snap free of elevation link 160 and move downward. Typically, the downward force is sufficiently strong to move the arbor block down in just several milliseconds.

A post 186, shown in FIGS. 17 and 18, is mounted on structure 122 connecting the front and rear trunnions, and the post limits the downward motion of the arbor block. The arbor block stops moving down when it hits post 186. A bumper or cushion may be positioned on the post or arbor block to help absorb the energy of the impact.

After the arbor block has snapped free of elevation link 160, a user can reset the system by manually pivoting the arbor block up until pin 172 snaps into aperture 174, or the user can turn threaded shaft 140 to move carriage assembly 142 down the shaft until pin 172 snaps into place. The elevation link assembly of the saw can then be used to adjust the elevation of the blade relative to the table.

Figure 4:
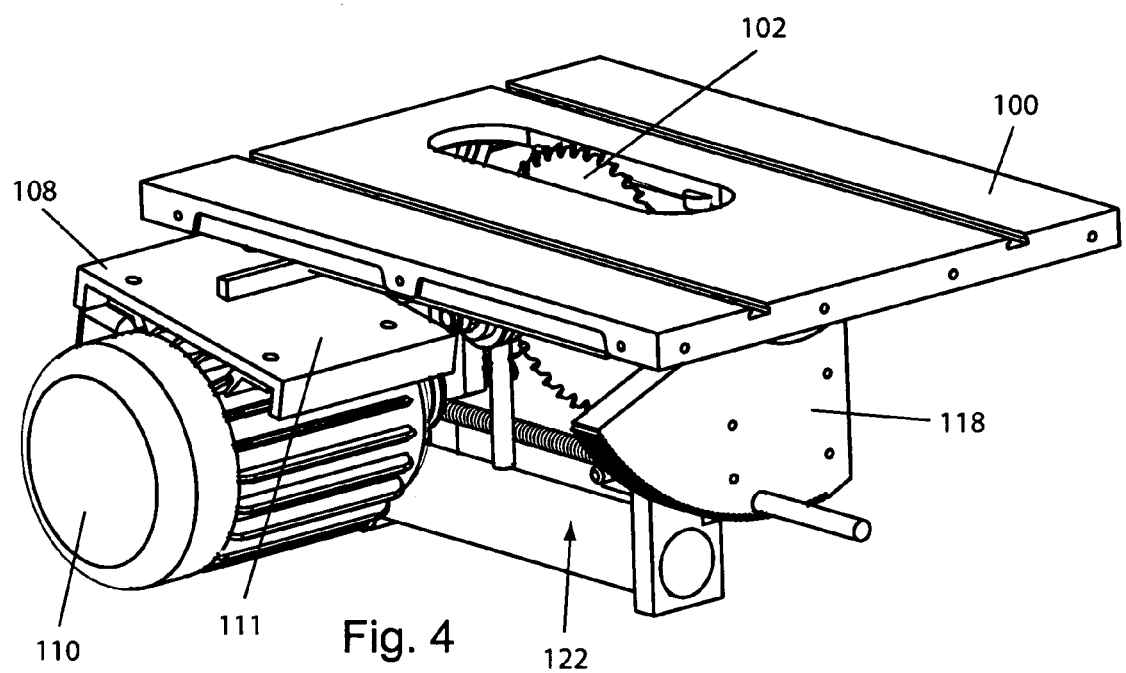
FIG. 4 is another perspective view of the table saw shown in FIG. 3.
Figure 5:
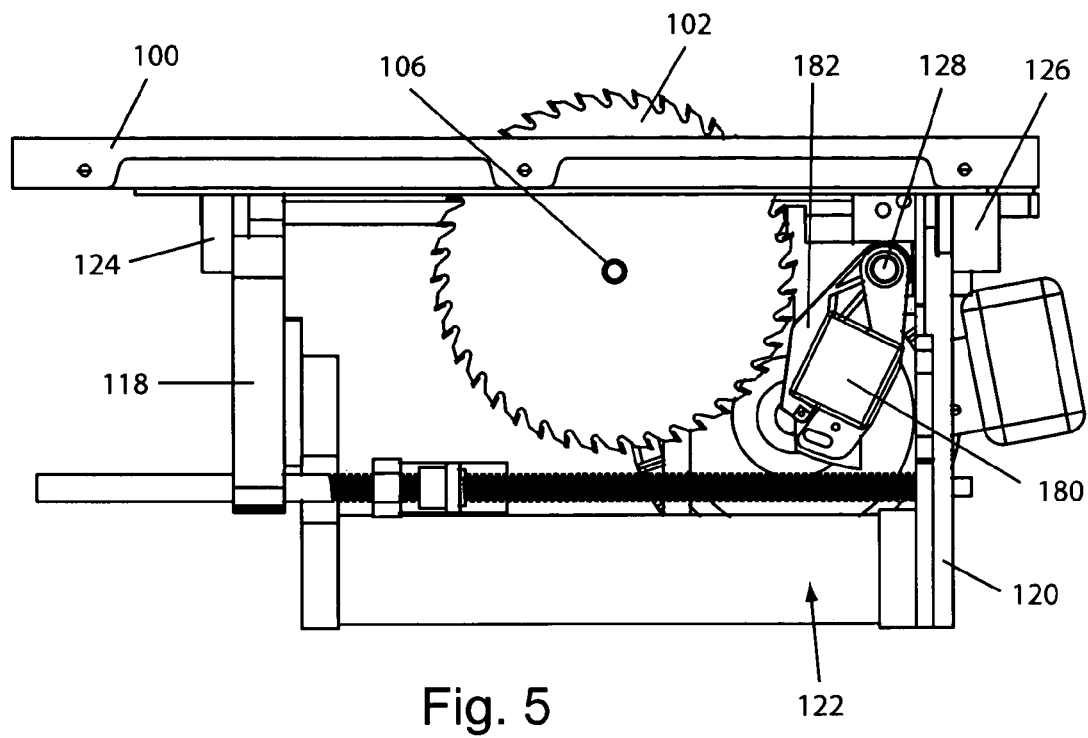
FIG. 5 is a right side elevation view of the saw shown in FIG. 3.
Figure 6:
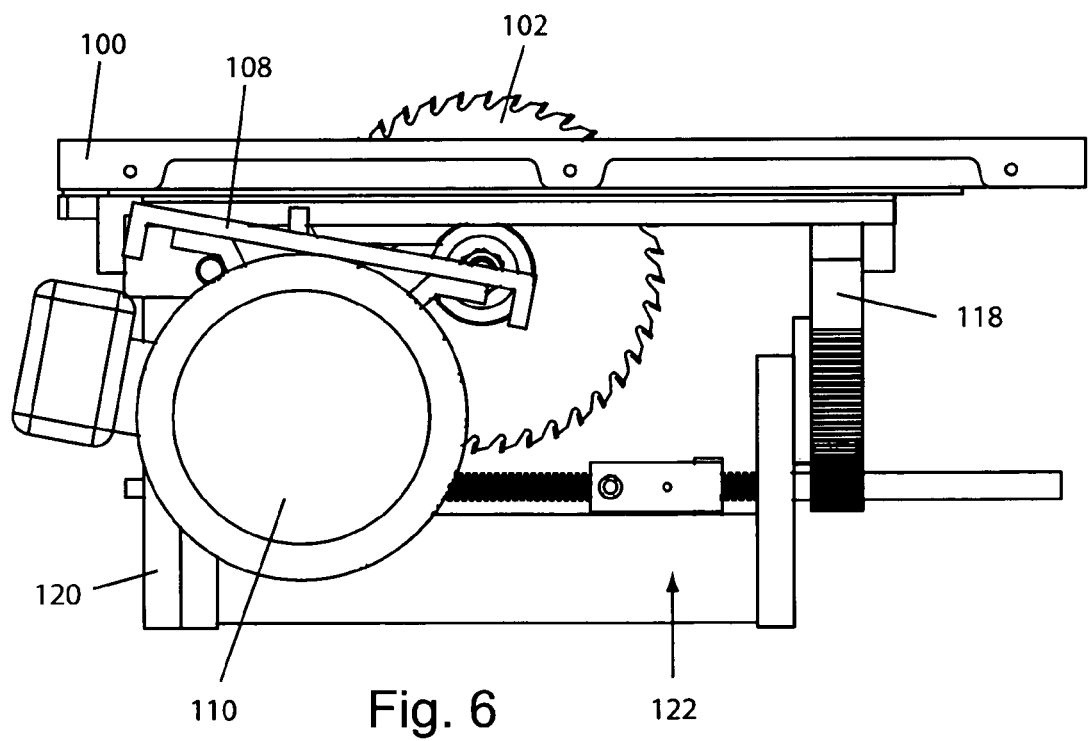
FIG. 6 is a left side elevation view of the saw shown in FIG. 3.
Figure 7:
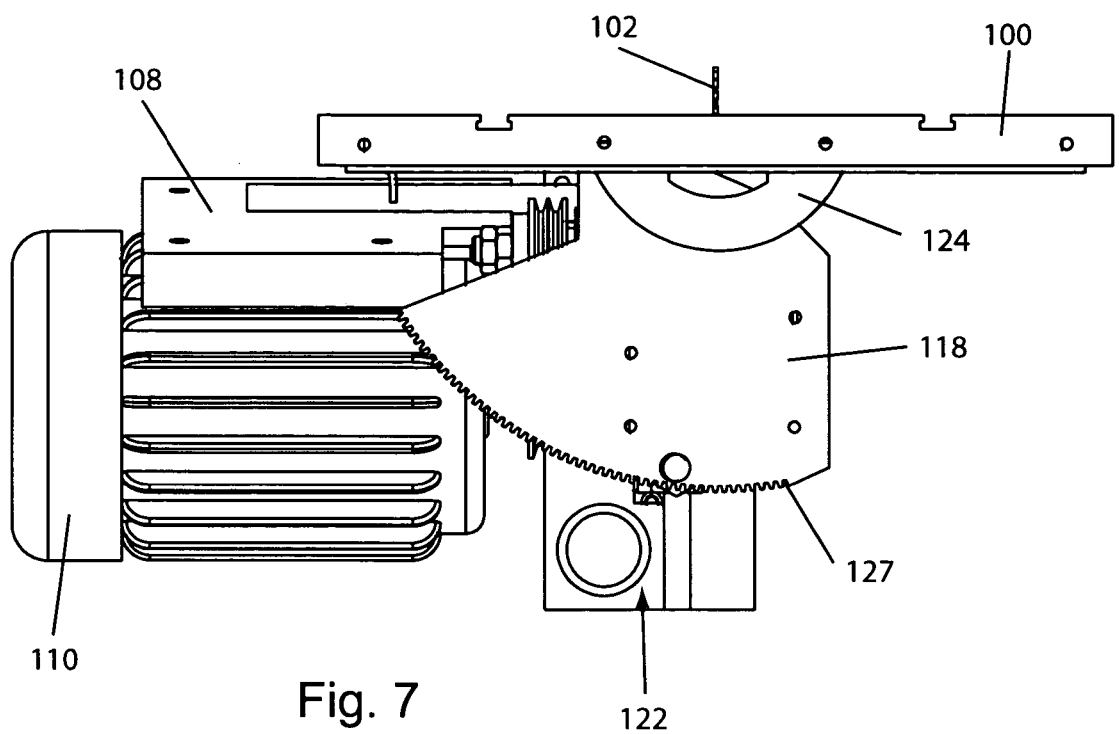
FIG. 7 is a front elevation view of the saw shown in FIG. 3.
Figure 8:
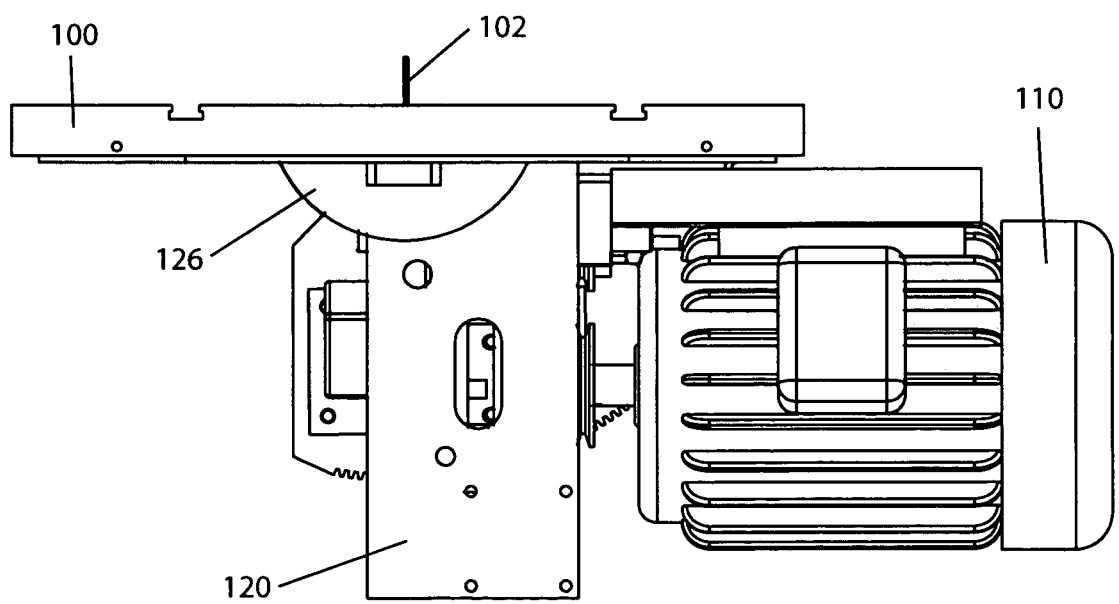
FIG. 8 is a back elevation view of the saw shown in FIG. 3.
Figure 9:
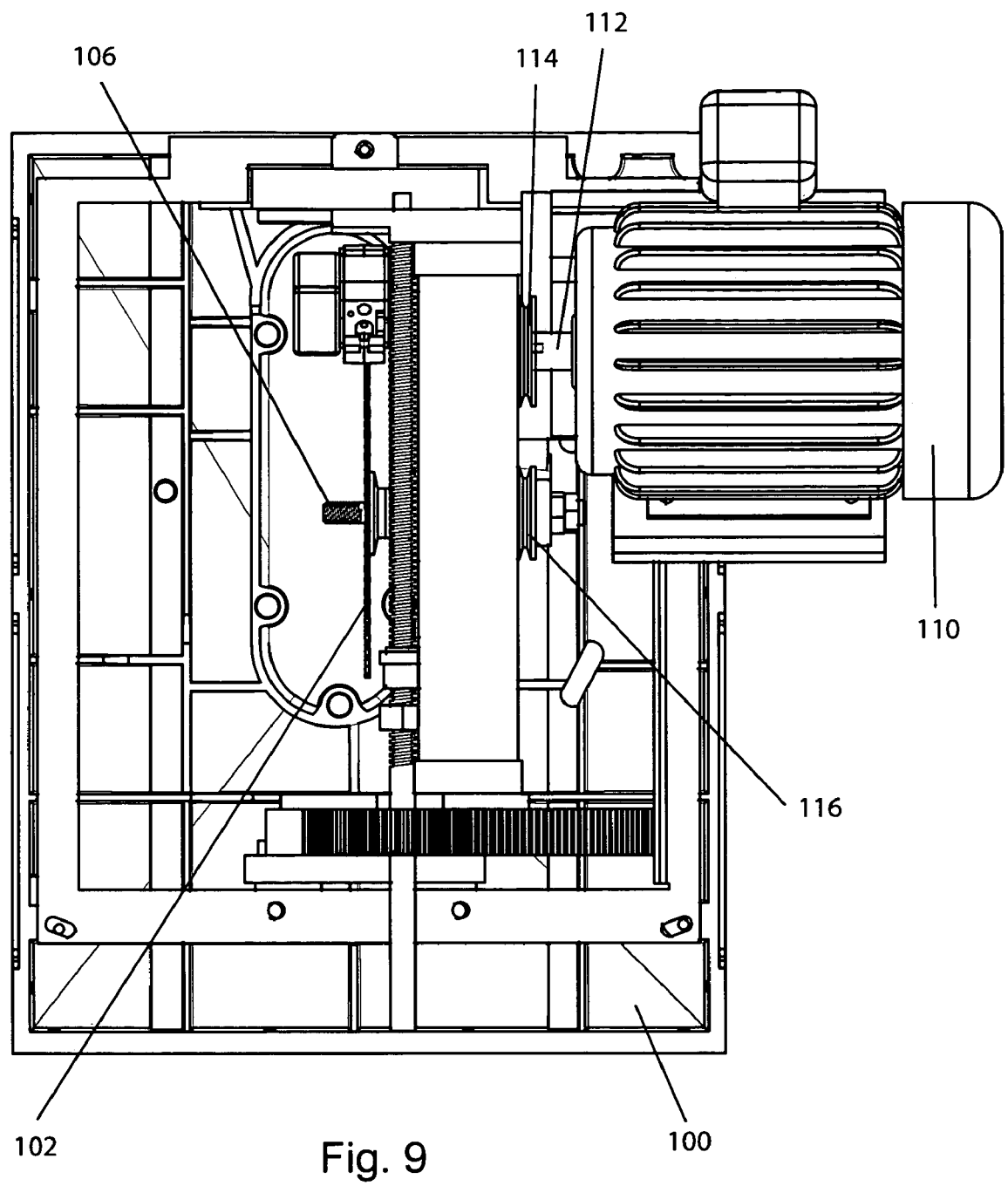
FIG. 9 is a bottom view of the saw shown in FIG. 3.

As descried above, and as shown in FIGS. 4 and 6, motor 110 is mounted directly to arbor block 108. Therefore, motor 110 will move with the arbor block when the arbor block retracts. The weight of the motor helps the arbor to retract as quickly as possible in the event of an accident. Also, motor 110 will include an armature or rotor that spins, and that will have an angular momentum. When an accident happens and the reaction system in the saw stops the motor, the angular momentum of the armature or rotor will also urge the arbor bock down because the motor is mounted to the arbor block.

INDUSTRIAL APPLICABILITY

The present invention is applicable to power equipment, and specifically to woodworking equipment such as table saws. The present invention provides a safety system wherein a cutting tool or other dangerous item is retracted upon the occurrence of a specified event, such as when accidental contact between a user and a blade is detected. Retraction of a cutting tool, for example, can minimize any injury from accidental contact with the cutting tool by reducing the amount of time the cutting tool is in contact with a user or by moving the cutting tool to a position where the user cannot contact it. A retraction system may be used in combination with other safety features to maximize the performance of an overall safety system. For example, a retraction system may be used with a system that quickly stops a cutting tool so that the cutting tool simultaneously stops and moves away from a user.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A woodworking machine having a cutting region for cutting work pieces, comprising:
   a motor;
   a movable cutting tool powered by the motor and adapted to cut work pieces in the cutting region;
   a detection system adapted to detect one or more dangerous conditions between a person and the cutting tool; and
   a reaction system associated with the detection system and the cutting tool, where the reaction system is configured to retract the cutting tool at least partially away from the cutting region upon detection of at least one of the dangerous conditions by the detection system, where the reaction system includes an arbor block, and where the motor is mounted to the arbor block.

2. The machine of claim 1, where the detection system is adapted to detect accidental contact between a person and the cutting tool, and where the reaction system is configured to retract the cutting tool at least partially away from the cutting region upon detection of such contact by the detection system.

3. The machine of claim 1, where the detection system is adapted to detect dangerous proximity between a person and the cutting tool, and where the reaction system is configured to retract the cutting tool at least partially away from the cutting region upon detection of such proximity by the detection system.

4. The machine of claim 1, where the cutting tool includes a rotatable blade having angular momentum when rotating, and where the reaction system is configured to retract the blade by using, at least partially, the angular momentum of the blade.

5. The machine of claim 4, where the reaction system includes a brake mechanism configured to stop the rotation of the blade upon detection of the at least one dangerous condition by the detection system.

6. The machine of claim 1, where the motor includes a rotatable portion having angular momentum when rotating, and where the reaction system is configured to retract the blade by using, at least partially, the angular momentum of the rotatable portion.

7. The machine of claim 1, where the arbor block and motor retract with the cutting tool.

8. The machine of claim 7, where the weight of the motor urges the cutting tool to move away from the cutting region.

9. The machine of claim 1, where the cutting tool is configured to retract by pivoting away from the cutting region.

10. A woodworking machine having a cutting region for cutting work pieces, comprising:
    a motor;
    a movable cutting tool powered by the motor and adapted to cut work pieces in the cutting region;
    a detection system adapted to detect one or more dangerous conditions between a person and the cutting tool; and
    a reaction system associated with the detection system and the cutting tool, where the reaction system includes an elevation link assembly associated with the movable cutting tool to adjust the position of the movable cutting tool, and where the elevation link assembly is configured to allow the cutting tool to move at least partially away from the cutting region upon detection of at least one of the dangerous conditions by the detection system.

11. The machine of claim 10, where the machine includes an arbor block supporting the movable cutting tool, and where the elevation link assembly is releasably connected to the arbor block.

12. The machine of claim 11, where the elevation link assembly includes a spring force to at least partially connect to the arbor block.

13. The machine of claim 10, where the elevation link assembly includes a threaded shaft.

14. The machine of claim 13, where the elevation link assembly further includes a carriage assembly on the threaded shaft.

15. The machine of claim 14, where the elevation link assembly further includes an elevation link connected to the carriage assembly.

16. The machine of claim 10, further comprising an arbor block supporting the movable cutting tool and a pin extending from the arbor block, where the elevation link assembly includes an elevation link having an aperture, and where the elevation link is connected to the arbor block by the pin extending into the aperture.

17. The machine of claim 16, where the elevation link is configured to apply a spring force on the pin in the aperture.

18. The machine of claim 17, where the spring force is applied by a slot in the elevation link that connects to the aperture in the elevation link.

19. The machine of 10, further including a support structure for the moveable cutting tool, and where the elevation link assembly includes a threaded shaft, a carriage assembly on the threaded shaft, and a link between the carriage assembly and the support structure.

20. A woodworking machine, comprising:
    cutting means for cutting workpieces;
    means for detecting accidental contact between a person and the cutting means; and
    means for retracting the cutting means away from the person in response to such detection of accidental contact.

* * * * *